T. A. EDISON.
SOUND REPRODUCER.
APPLICATION FILED NOV. 14, 1910.
1,119,141.
Patented Dec. 1, 1914.
2 SHEETS—SHEET 2.
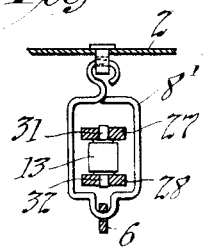
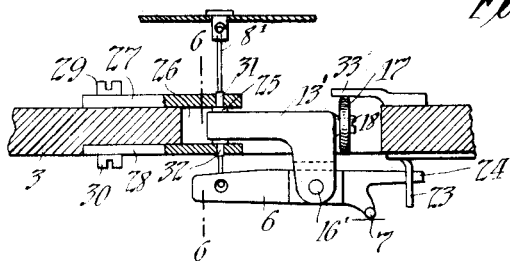
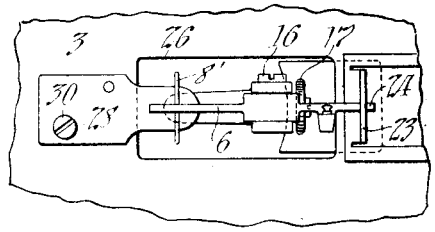
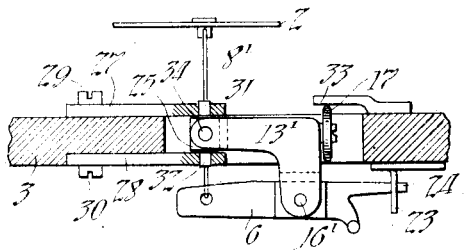
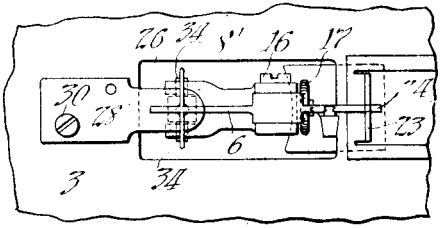

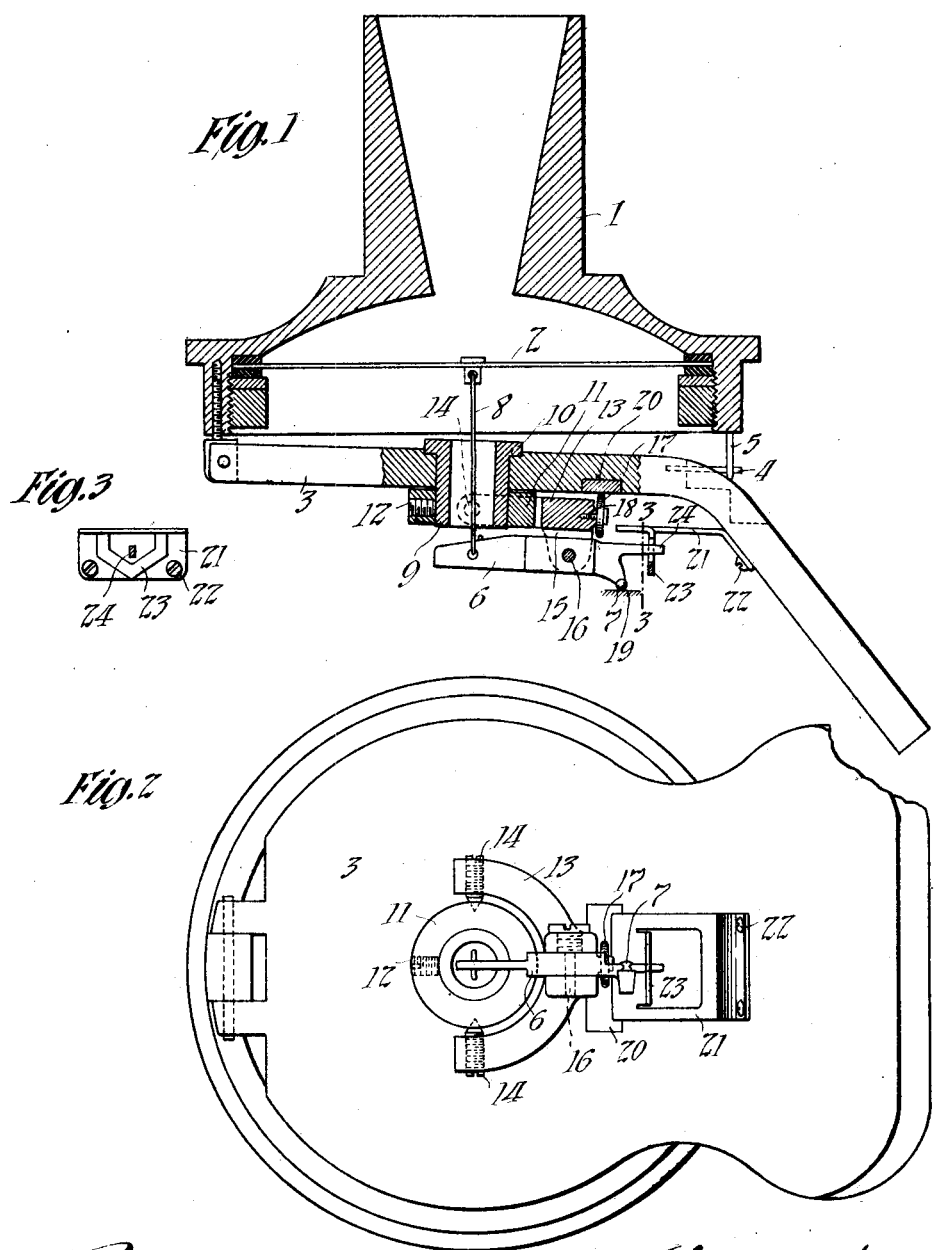

UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

SOUND-REPRODUCER.

1,119,141.   Specification of Letters Patent.   Patented Dec. 1, 1914.

Application filed November 14, 1910. Serial No. 592,226.

*To all whom it may concern:*

Be it known that I, THOMAS A. EDISON, a citizen of the United States, and a resident of Llewellyn Park, West Orange, Essex county, New Jersey, have invented certain new and useful Improvements in Sound-Reproducers, of which the following is a description.

My invention relates to sound reproducers, and my object is to provide a reproducer in which the stylus lever is so mounted that the stylus will always track the record faithfully under all circumstances. The stylus lever is so mounted as to be moved with the greatest freedom in conformity with the engagement of the stylus in the record groove. The stylus lever and its mounting are of small mass or inertia and are movable laterally with respect to the floating weight supporting the same, the stylus lever also preferably being bodily movable with respect to the weight in a plane at right angles to the plane of the latter. The provision of means permitting lateral movement of the stylus with respect to the floating weight is intended to permit the stylus to track the record groove without having to overcome the inertia of the floating weight when a lateral movement is necessary, and the provision of means permitting the stylus lever to move bodily toward and away from the floating weight prevents binding of the mounting in the weight and increases the sensitiveness and efficiency of the device.

Another object of my invention is the provision of a roller upon the stylus lever mounting, this roller contacting the under side or other surface of the floating weight during the lateral movements of the lever with respect to the weight, whereby friction is reduced.

Other objects of my invention will appear more fully in the following specification and appended claims.

In order that my invention may be more clearly understood, attention is hereby directed to the accompanying drawings, forming part of this specification, in which—

Figure 1 represents in side elevation and in vertical cross section a reproducer embodying one form of my invention. Fig. 2 is a bottom plan view of the same. Fig. 3 is a cross section on line 3—3 of Fig. 1 looking to the right. Fig. 4 is a partial side elevation and vertical cross section through a modified form of my device. Fig. 5 is a bottom plan view of the same. Fig. 6 is a cross section taken on line 6—6 in Fig. 4, and Figs. 7 and 8 are views similar to Figs. 4 and 5 of another modified form of my device.

Referring to the drawings, the reproducer sound box 1 is provided with the diaphragm 2 and with the floating weight 3 pivotally secured to the sound box 1 in the usual manner. The mounting of floating weight 3 may permit slight lateral movement of the weight with respect to the sound box, if desired, as well as an up and down oscillation of the weight, movement of the weight being limited by the engagement of pin 4 carried by the weight within stirrup 5 carried by the sound box. Stylus lever 6 carries stylus 7 and is connected to diaphragm 2 by link 8.

The stylus lever is preferably mounted in the following manner:—A hollow stud or sleeve 9 is rotatably mounted in floating weight 3, being free to rotate about an axis extending through link 8 at right angles to the median plane of floating weight 3 or substantially at right angles to the plane of diaphragm 2. This sleeve may be flanged as shown at 10 to form a bearing surface engaging the upper surface of the floating weight, or within a countersunk depression on the upper side of the weight as shown. The link 8 connecting the stylus lever to the diaphragm extends substantially axially through the interior of sleeve 9. A collar 11 is secured upon the lower end of sleeve 9 below floating weight 3 by any suitable means, as the screw 12; and a yoke 13 is pivotally connected to collar 11 by screw centers 14 engaging within conical cavities at opposite points upon the periphery of collar 11, the centers 14 having a common axis passing through link 8. Yoke 13 is provided with a depending lug 15 at a point therein most distant from the centers 14. The horizontal pin 16 upon which stylus lever 6 is pivotally supported is carried by lug 15 of member 13. Also, preferably, a roller or wheel 17 is secured to the end of yoke 13 beyond lug 15, being mounted upon stud 18 in yoke 13 and free to rotate upon the said stud. When stylus 7 is in engagement with the record illustrated diagrammatically in Fig. 1 at 19, the roller 17 will engage the under side of floating weight 3 and support the latter. A hardened bearing surface or runway 20 is preferably provided upon the under side of the floating weight for the engagement of roller 17 therewith.

For centering the stylus lever with respect to the record groove, I preferably provide a bracket 21 secured to the floating weight as by screws 22 and having a downwardly extending V-shaped stirrup 23 within which extends a nose or projection 24 formed on the forward end of stylus lever 6. When the floating weight is lifted to disengage the stylus from the record, yoke 13 swings about its pivots 14 by gravity and stylus 7 is centered by the coaction of nose 24 of the lever with the V-shaped stirrup 23.

It is to be understood that in the structure described the stylus lever is not only pivotally movable about pin 16 as the stylus 7 tracks the vertically undulating bottom of the sound groove, but that also the stylus lever as a whole is movable universally with respect to the floating weight, and that because of the pivotal connection of member 13 with member 9, up and down movement of the member 13 is permitted without causing a tendency of the member 9 to bind in the floating weight 3 and said member is accordingly permitted to oscillate in said weight without binding. The moving parts constituting the mounting of the stylus lever are of little mass, and consequently the inertia necessary to be overcome in moving the same is slight. The member 9 or equivalent thereof rotatably mounted in the floating weight need not necessarily be placed in the position shown in line with the center of diaphragm 2, although I consider this position the most desirable. The engagement of roller 17 with the under side of the floating weight greatly reduces friction during the lateral movement of the stylus with respect to the floating weight. The upper side of collar 11 may frictionally engage the under side of the floating weight during lateral movement of the stylus in operation.

In Figs. 4 and 5 I have shown a modified form of my device, in which stylus lever 6 is pivotally mounted upon pin 16' carried by member 13' which is mounted to oscillate laterally with respect to floating weight 3 by being secured to pin 25 positioned at right angles to the median plane of floating weight 3 within an opening 26 in said weight through which opening the member 13' also extends. Plates 27 and 28 are secured upon the upper and lower sides of floating weight 3 respectively as by screws 29 and 30. These plates extend somewhat across opening 26 in the floating weight, and afford a bearing for the reduced portions 31, 32 of pin 25, the pin 25 and member 13' thus being adapted to oscillate laterally with respect to the floating weight during the tracking of stylus 7 within the record groove. Pin 25 is preferably located in line with the center of diaphragm 2, as shown. Roller 17 is rotatably mounted upon stud 18 on the end of member 13' in the same manner as described in connection with Fig. 1, this roller being adapted to contact and frictionally bear against the under surface of a bracket 33 extending from the upper side of floating weight 3 part way across opening 26 in the floating weight. In this form of my device, the link 8' joining diaphragm 2 to the tail of lever 6 is formed as shown in Fig. 6, to pass through opening 26 in the floating weight and extend around plates 27 and 28 and member 13' therein, the link preferably passing around the said members on both sides in an approximately rectangular form, as shown. In this construction, the stylus lever is not movable bodily toward and from the floating weight, as in the form of my device first described, but is laterally movable with respect to the weight. This construction provides only rolling friction for the member 13' between the roller 17 and the bracket 33 in addition to the slight turning friction of the journals 31, 32 in their bearings in plates 27 and 28.

In Figs. 7 and 8 I have illustrated another construction in which stylus lever 6 is movable bodily up and down with respect to the floating weight, as well as laterally with respect to the same, as in the case of the structure illustrated in Figs. 1 and 2. In this form of my device, lever 6 is pivoted on stud 16' carried by a depending lug of member 13', which is pivoted upon laterally extending reduced portions or journals 34, 34 of pin 25 having reduced portions or journals 31 and 32 rotatably mounted in plates 27 and 28 secured upon the upper and lower surfaces of floating weight 3 as described in connection with Figs. 4 and 5. Thus, in this structure member 13' may oscillate in a plane at right angles to diaphragm 2 about pivot pin 34, and also in a plane at right angles thereto about the axis of journals 31 and 32 supported in plates 27 and 28. In this construction, the roller 17 bears against the under surface of bracket 33, as in the construction illustrated in Figs. 4 and 5. A V-shaped stirrup 23 carried by floating weight 3 coöperates with nose 24 of lever 6 to center the stylus lever, in the structures illustrated in Figs. 4, 5, 6 and 8, in the same manner as described in connection with Figs. 1 and 2. The link 8' in the construction illustrated in Figs. 7 and 8 is of the same form as described in connection with Figs. 4 and 5. It should be understood that my invention is not limited to the exact construction and details described, but may be modified within the scope of my invention as claimed in the appended claims.

Having now described my invention, what I claim and desire to protect by Letters Patent is as follows:—

1. In a sound reproducer, the combination with vibratory means, of a stylus lever connected thereto, a stylus carried by said lever, a pivoted floating weight, a member supported by said weight and free to rotate about an axis at an angle thereto, and a member pivoted to said first named member and provided with means forming a support for said weight when said stylus is in engagement with a record, said lever being carried by said second named member, substantially as described.

2. In a sound reproducer, the combination with vibratory means of a stylus lever connected thereto and stylus carried thereby, a pivoted floating weight, and a member pivotally supporting said lever, said member being supported by said weight, being universally movable with respect thereto and being provided with means forming a support for said weight when said stylus is in engagement with a record, substantially as described.

3. In a sound reproducer, the combination with vibratory means of a stylus lever connected thereto and stylus carried thereby, a pivoted floating weight, a member supported by said weight free to rotate about an axis substantially at right angles thereto, and a member pivoted to said first member said second member being free to oscillate about an axis at an angle to said first axis and being provided with means forming a support for said weight when said stylus is in engagement with a record, said lever being carried by said second member, substantially as described.

4. In a sound reproducer, the combination with vibratory means of a stylus lever connected thereto and stylus carried thereby, a pivoted floating weight, a member supported by said weight free to rotate about an axis substantially at right angles thereto, and a member pivoted to said first member, said second member being free to oscillate about an axis at an angle to said first axis and being provided with means forming a support for said weight when said stylus is in engagement with a record, and a support upon which said lever is pivotally mounted carried by said second member, substantially as described.

5. In a sound reproducer, the combination with vibratory means of a stylus lever connected thereto and stylus carried thereby, a pivoted floating weight, and means by which said lever is pivoted, supported from said weight and arranged to permit universal movement of the fulcrum of said lever with respect to said weight, said last named means comprising a member forming a support for said weight when said stylus is in engagement with a record, substantially as described.

6. In a sound reproducer, the combination with vibratory means of a stylus lever connected thereto and stylus carried thereby, a pivoted floating weight, a member supported by said weight, free to move laterally and also up and down with respect thereto and arranged to bear upon said weight in its lateral movement with rolling friction, and a pivotal support for said lever carried by said member, substantially as described.

7. In a sound reproducer, the combination with vibratory means of a stylus lever connected thereto and stylus carried thereby, a pivoted floating weight, a member supported by said weight and free to move laterally and also up and down with respect thereto, a roller carried by said member adapted to frictionally bear upon said weight, and a pivotal support for said lever carried by said member, substantially as described.

8. In a sound reproducer, the combination with vibratory means of a stylus lever connected thereto and stylus carried thereby, a pivoted floating weight, a member supported by said weight free to rotate about an axis substantially at right angles thereto, and a member pivoted to said first member free to oscillate about an axis at an angle to said first axis, means carried by said second member adapted to contact said weight to form a support therefor when said stylus is in engagement with a record, and a pivotal support for said lever carried by said second member, substantially as described.

9. In a sound reproducer, the combination with vibratory means of a stylus lever connected thereto and stylus carried thereby, a pivoted floating weight, a member supported by said weight free to rotate about an axis substantially at right angles thereto, and a member pivoted to said first member free to oscillate about an axis at an angle to said first axis, a roller carried by said second member adapted to contact said weight when said stylus is in engagement with a record and to roll upon the surface of the same when said first member moves about its axis, and a pivotal support for said lever carried by said second member, substantially as described.

10. In a sound reproducer, the combination of vibratory means, a stylus lever, a stylus carried by said lever, connecting means between said lever and said vibratory means, a pivoted floating weight, a member supported by said weight and free to rotate about an axis passing through said connecting means, and a member pivoted to said first named member and free to oscillate about an axis extending at an angle to said first named axis and passing through said connecting means, means carried by said second member adapted to contact said weight to form a support therefor when the stylus is in engagement with the record, and a pivotal support for said lever carried by said second member, substantially as described.

11. In a sound reproducer, the combination of vibratory means, a stylus lever, a stylus carried by the forward end of said lever, connecting means between said lever and said vibratory means, means pivotally supporting said lever intermediate said stylus and said connecting means, said supporting means being free to move laterally about an axis passing through said connecting means, and means coacting with the forward end of said lever for centering the same, whereby the effective position of said centering means is remote from said axis, substantially as described.

This specification signed and witnessed this 9th day of November, 1910.

THOS. A. EDISON.

Witnesses:
 DYER SMITH,
 ANNA R. KLEHM.